United States Patent
Ho et al.

(10) Patent No.: US 9,491,163 B2
(45) Date of Patent: *Nov. 8, 2016

(54) OBJECT DELIVERY AUTHENTICATION

(71) Applicant: TP Lab Inc., Palo Alto, CA (US)

(72) Inventors: Chi Fai Ho, Palo Alto, CA (US); Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,659

(22) Filed: Jul. 7, 2015

(65) Prior Publication Data
US 2015/0312247 A1    Oct. 29, 2015

Related U.S. Application Data

(63) Continuation of application No. 13/330,182, filed on Dec. 19, 2011, now Pat. No. 9,106,679, which is a continuation of application No. 11/282,549, filed on Nov. 18, 2005, now Pat. No. 8,103,874.

(51) Int. Cl.
| | |
|---|---|
| H04L 29/06 | (2006.01) |
| H04L 9/32 | (2006.01) |
| H04W 12/06 | (2009.01) |

(52) U.S. Cl.
CPC ......... *H04L 63/0823* (2013.01); *H04L 9/3271* (2013.01); *H04L 63/126* (2013.01); *H04W 12/06* (2013.01)

(58) Field of Classification Search
CPC .............................................. G06F 2221/2113
See application file for complete search history.

(56) References Cited

U.S. PATENT DOCUMENTS

| | | | | |
|---|---|---|---|---|
| 5,774,525 | A * | 6/1998 | Kanevsky | ............... G06F 21/31 |
| | | | | 379/188 |
| 2002/0168965 | A1 | 11/2002 | Gregory | |
| 2003/0061487 | A1 | 3/2003 | Angelo | |
| 2003/0145229 | A1 | 7/2003 | Cohen | |
| 2003/0233328 | A1 | 12/2003 | Scott | |
| 2004/0073813 | A1 | 4/2004 | Pinkas | |
| 2005/0273615 | A1 | 12/2005 | Silverbrook | |
| 2007/0016785 | A1 | 1/2007 | Guay | |
| 2007/0088660 | A1* | 4/2007 | Abu-Amara | ............ G06F 21/10 |
| | | | | 705/57 |
| 2008/0208580 | A1 | 8/2008 | Scholl | |

OTHER PUBLICATIONS

Office action for corresponding U.S. Appl. No. 11/282,549, dated Sep. 10, 2009.
Office action for corresponding U.S. Appl. No. 11/282,549, dated Mar. 16, 2010.

(Continued)

*Primary Examiner* — Christopher Brown
(74) *Attorney, Agent, or Firm* — Timothy X. Gibson, Esq.; Gibson & Dernier LLP

(57) ABSTRACT

A method and system for authenticating delivery including the steps of receiving by a receiver a delivery information package from a deliverer over a network during a communication between the receiver and the deliverer, wherein the delivery package includes deliverer identity information, sending an authentication request of the received delivery package from the receiver to an authentication module having a hardware processor, over at least one of a call network and an additional network, and authenticating the received delivery package using the deliverer identity information.

8 Claims, 8 Drawing Sheets

(56) References Cited

OTHER PUBLICATIONS

Office action for corresponding U.S. Appl. No. 11/282,549, dated Feb. 11, 2011.
Office action for corresponding U.S. Appl. No. 11/282,549, dated Jul. 19, 2011.
Office action for corresponding U.S. Appl. No. 13/330,182, dated May 30, 2012.
Office action for corresponding U.S. Appl. No. 13/330,182, dated Oct. 29, 2012.
Office action for corresponding U.S. Appl. No. 13/330,182, dated Dec. 20, 2013.
Office action for corresponding U.S. Appl. No. 13/330,182, dated Jul. 1, 2014.
Office action for corresponding U.S. Appl. No. 13/330,182, dated Oct. 24, 2014.

* cited by examiner

OBJECT DELIVERY AUTHENTICATION

CROSS-REFERENCE TO RELATED APPLICATIONS

This application is a continuation of U.S. patent application Ser. No. 13/330,182 filed Dec. 19, 2011, which is a continuation of U.S. patent application Ser. No. 11/282,549 filed Nov. 18, 2005, now U.S. Pat. No. 8,103,874, the entireties of which are incorporated herein by reference

BACKGROUND OF THE INVENTION

Use of telephones and related communication devices range from casual calls between family and friends to serious communications between a person and a business, business to business and within a business. During such telephone calls, parties often desire to exchange information, documents or other items, or to have information sent from one party to the other. During such transfers, one party is often in the position of having to rely on the validity of the information, documents or items (hereinafter "objects") transferred from the other. For example, a first party of a telephone call must assume a certain level of trust for any objects delivered by the second party.

In further examples, the second party provides the first party with their identity, such as "Patient Registration Department of Local Hospital", "Shipment Department of Local Hardware Store", "Credit Card Fraud Unit of Major Bank", or a given name or surname. The first party assumes that the identity is authentic and trusts the objects delivered by the second party.

Likewise, by way of example, the first party might receive a telephone call from the second party, and the telephone service provides the first party with the caller identity of the telephone call. While the first party assumes that the caller identity represents the second party and thus trusts the objects delivered by the second party, the caller identity might, in fact, identify only a telephone subscription used by the second party to make the telephone call, and not the actual identity of the second party.

While an assumption of trust may be sufficient for casual telephone calls, such as between friends and family, it is not necessarily sufficient for more serious or business-related communications, such as between a business and its customers or document exchanges between businesses. This demonstrates the need to provide a solution for authenticating the delivery of objects from one party to another during or in association with a telephone call or other communication between parties.

It is thus desirable to provide a method and system that allows a party to authenticate the delivery of objects from another party in association with a telephone call or other communication.

SUMMARY OF THE INVENTION

An aspect of the present invention provides an object delivery authentication method. The method includes receiving by an object receiver an object delivery information package from an object deliverer over a call network connecting the object receiver and the object deliverer. The object delivery information package comprises object information and object deliverer identity information. Next, the object receiver receives an object from the object deliverer, and the receipt of the object is authenticated by the object receiver using the object information and object deliverer identity information.

In one aspect of the invention, the authentication occurs over the call network during the communication between the object deliverer and object receiver.

In another aspect of the invention, the authentication occurs over the call network during a different communication between the object deliverer and object receiver.

In a further aspect of the invention, the authentication occurs during a second communication between the object deliverer and object receiver using a different call network.

Another aspect of the invention uses a non-voice network for the authentication.

In another aspect of the invention, the authentication further includes requesting authentication of receipt of the object from an authentication module by the object receiver, and receiving a notification from the authentication module by the object receiver. The notification indicates whether the object receipt is authentic.

In an aspect of the invention, authentication is requested from the authentication module by the object receiver over a network. In an embodiment, the authentication request is made via an application programming interface.

Another aspect of the invention provides that the authentication of receipt of the object performed by the authentication module includes the steps of comparing the object deliverer identity information received by the object receiver with an authentication datastore by the authentication module, the authentication module being in communication with the authentication datastore, and when the object deliverer identity information matches the authentication datastore, determining that the object receipt is authentic, or otherwise, determining that the object receipt is not authentic.

In a further aspect of the invention, the authentication datastore includes a hard disk drive.

In another further aspect of the invention, the authentication datastore includes a computer memory.

In another further aspect of the invention, the authentication datastore includes a computer database.

Another aspect of the invention provides that the authentication of receipt of the object performed by the authentication module includes the steps of comparing the object information received by the object receiver with an authentication datastore by the authentication module, the authentication module being in communication with the authentication datastore, and when the object information matches the authentication datastore, determining that the object receipt is authentic, or when the object information does not match the authentication datastore, determining that the object receipt is not authentic.

Another aspect of the invention provides an object delivery authentication system which includes an object receiver in communication with an object deliverer over a communications network, an object to be sent by the object deliverer to the object receiver, and an object delivery information package comprising object information and object deliverer identity information sent by the object deliverer to the object receiver, in which the object receiver authenticates the receipt of the object using the object delivery information.

Another aspect of the invention includes the system as described above, in which the object delivery information package is sent during a second communication between the object deliverer and the object receiver.

Another aspect of the invention includes the system as described above, in which the object delivery information package is sent from the object deliverer to the object receiver over an alternative communications network over which the object deliverer and object receiver communicate.

Another aspect of the invention includes the system as described above, in which the object delivery information package is sent from the object deliverer to the object receiver over an alternative communications network over which the object deliverer and object receiver communicate.

A further aspect of the present invention comprises the system described above additionally including an authentication module in communication with the object receiver. The authentication module includes an authentication datastore comprising a plurality of object delivery information, in which the authentication module receives an authentication request from the object receiver. The authentication request includes the object delivery information package sent to object receiver by object deliverer. The authentication module compares the object delivery information package with the plurality of object delivery information in the authentication datastore, and when the object delivery information package matches at least one of the plurality of object delivery information in the authentication datastore, the authentication module sends to the object receiver a result indicating that the object receipt is authentic by the authentication module, or otherwise, sends a result indicating that the object receipt is not authentic.

In another aspect of the invention, the comparison of the object delivery information package with the object delivery information in the authentication datastore includes comparison of object information only.

In another aspect of the invention, the comparison of the object delivery information package with the object delivery information in the authentication datastore includes comparison of object deliverer identity only.

DETAILED DESCRIPTION

"Object" as used herein broadly includes any item such as but not limited to a document or other item and all means by which such objects are transferred or preserved, including but not limited to, all written, printed, typewritten, Photostatted, photographed, recorded or otherwise reproduced communications, reproductions or material, correspondence, memoranda, business records, notebooks, ledgers, journals, schedules, checks, invoices, receipts, notes, calendars, worksheets, work papers and printouts and all material recorded, transmitted of stored by any mechanical or electronic means, such as hard drives and other data storage devices, tapes, disks, electronic mail or facsimile transmissions, digital or analog audio, video or audio/video, emails and other electronic records. In the described embodiments of the present invention, an object may comprise information in any form, such as described above, including but not limited to physical, electronic, optical, and magnetic representations of information.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Figure 1:
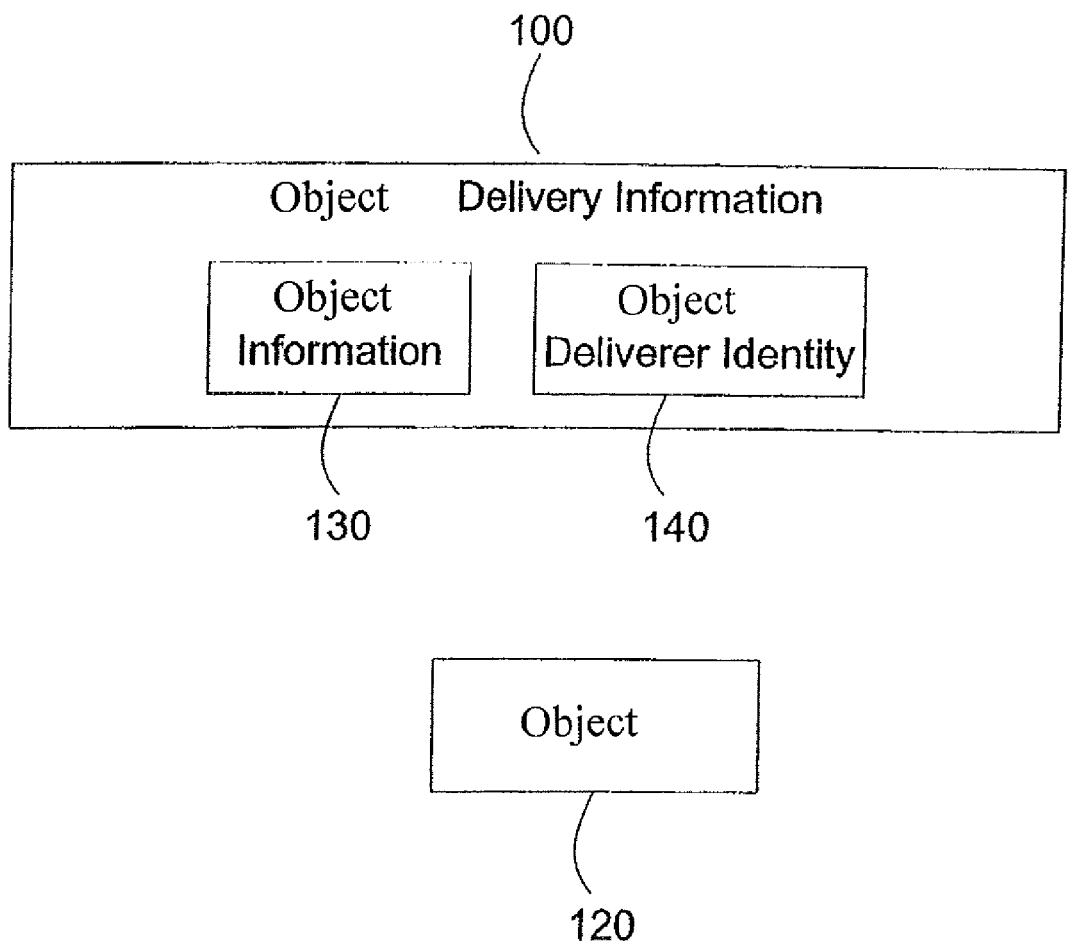
FIG. 1 is a schematic diagram illustrating an object and object delivery information package in accordance with an embodiment of the present invention.

FIG. 1 schematically depicts an object 120 and associated object delivery information 100. In an embodiment of the present invention, object delivery information 100 includes but is not limited to object information 130 and object deliverer identity information 140.

Object information 130 in an embodiment of the present invention may include any information regarding the object 120 itself, including but not limited to summary information, indexing information, categorization information, checksum information, length, word or letter count, an object type, and the like.

Object deliverer identity information 140 in an exemplary embodiment may include any information that serves to reveal the identity of the deliver. For example, this might include an individual's or business' name, a social security or tax identity number, a telephone number, a customer number, or any other identification information.

Figure 2:
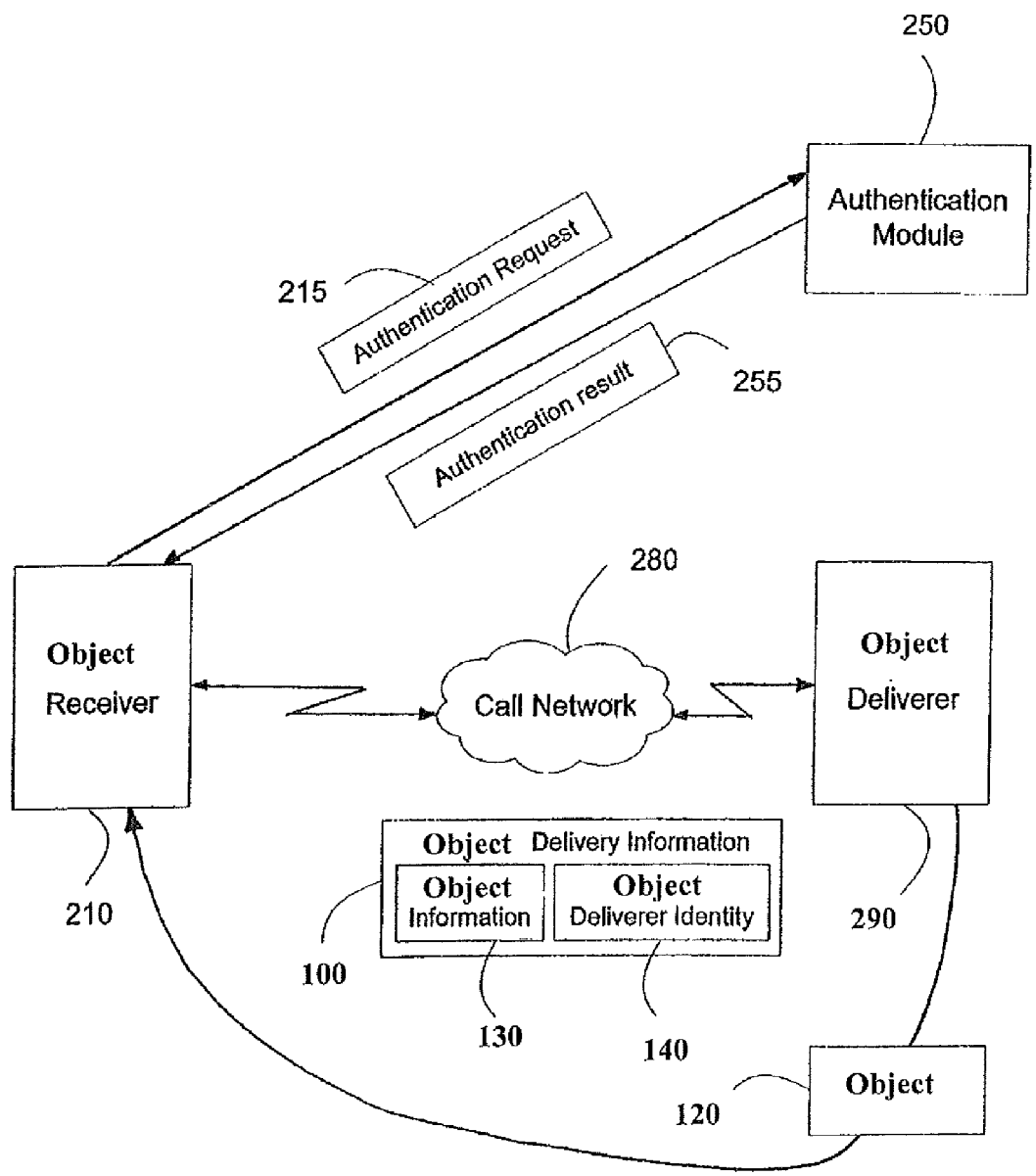
FIG. 2 is a schematic diagram of an exemplary process to authenticate the delivery of an object in accordance with an embodiment of the present invention.

A process to authenticate the delivery of an object 120 based on object delivery information 100 is schematically illustrated in FIG. 2.

In an exemplary embodiment, an object receiver 210 and an object deliverer 290 are conducting a voice call over a call network 280. The call network 280 may include a telephone network, or other network that supports voice calls. During the call, the object deliverer 290 has an object 120 to send to the object receiver 210.

In various embodiments, the call network 280 also supports data communications.

In an embodiment, the object deliverer 290 sends an object delivery information 100 to the object receiver 210 over the call. The object delivery information 100 preferably includes object information 130, which may be any information usable to identify the object 120. The object delivery information 100 may also or alternatively include object deliverer identity information 140, which may be any information usable to identify the object deliverer 290.

Next, the object receiver 210 receives the object delivery information 100, and uses it to authenticate the delivery of the object 120. In an exemplary embodiment, the object receiver 210 authenticates the delivery of the object 120 during a voice call.

In another exemplary embodiment, the object receiver 210 authenticates the delivery of the object 120 at a later time. For example, an object 120 includes an audio message, and the object deliverer sends a voice message to the object receiver 210 during a voice call. The voice message includes the object 120 and object delivery information 100. The object receiver 210 may then authenticate the delivery of the object 120 at the time the object receiver 210 listens to the voice message.

In an embodiment, the object receiver 210 authenticates the delivery of the object 120 by requesting authentication from an authentication module 250. For example, the object receiver 210 sends a request for authentication 215 to the authentication module 250 over a network (not depicted). The authentication request preferably includes object delivery information 100.

In another embodiment, the object receiver 210 sends the request for authentication 215 to the authentication 250 module via an application programming interface (not depicted). The exemplary application programming interface may, in turn, be in communication with the authentication module 250 and the object receiver 210.

Figure 3:
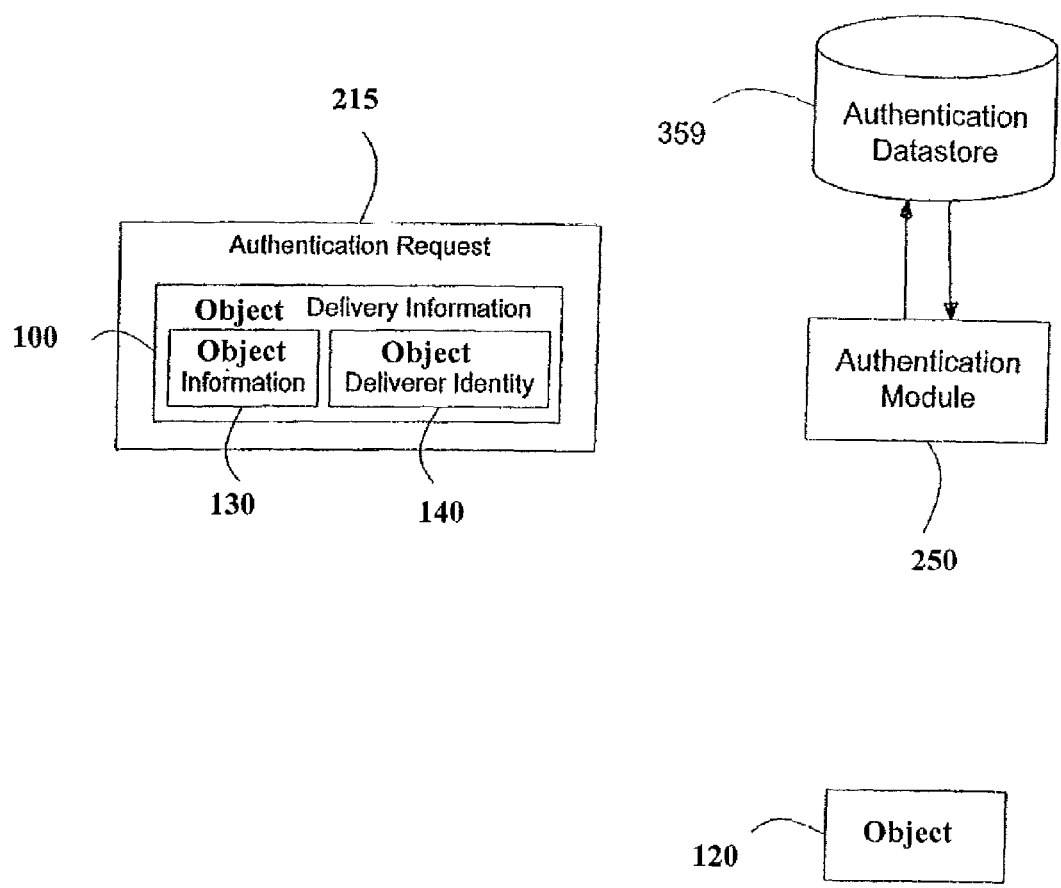
FIG. 3 is a schematic diagram illustrating a process of an exemplary embodiment for an authentication module to determine validity of delivery of an object in accordance with an embodiment of the present invention.
Figure 4:
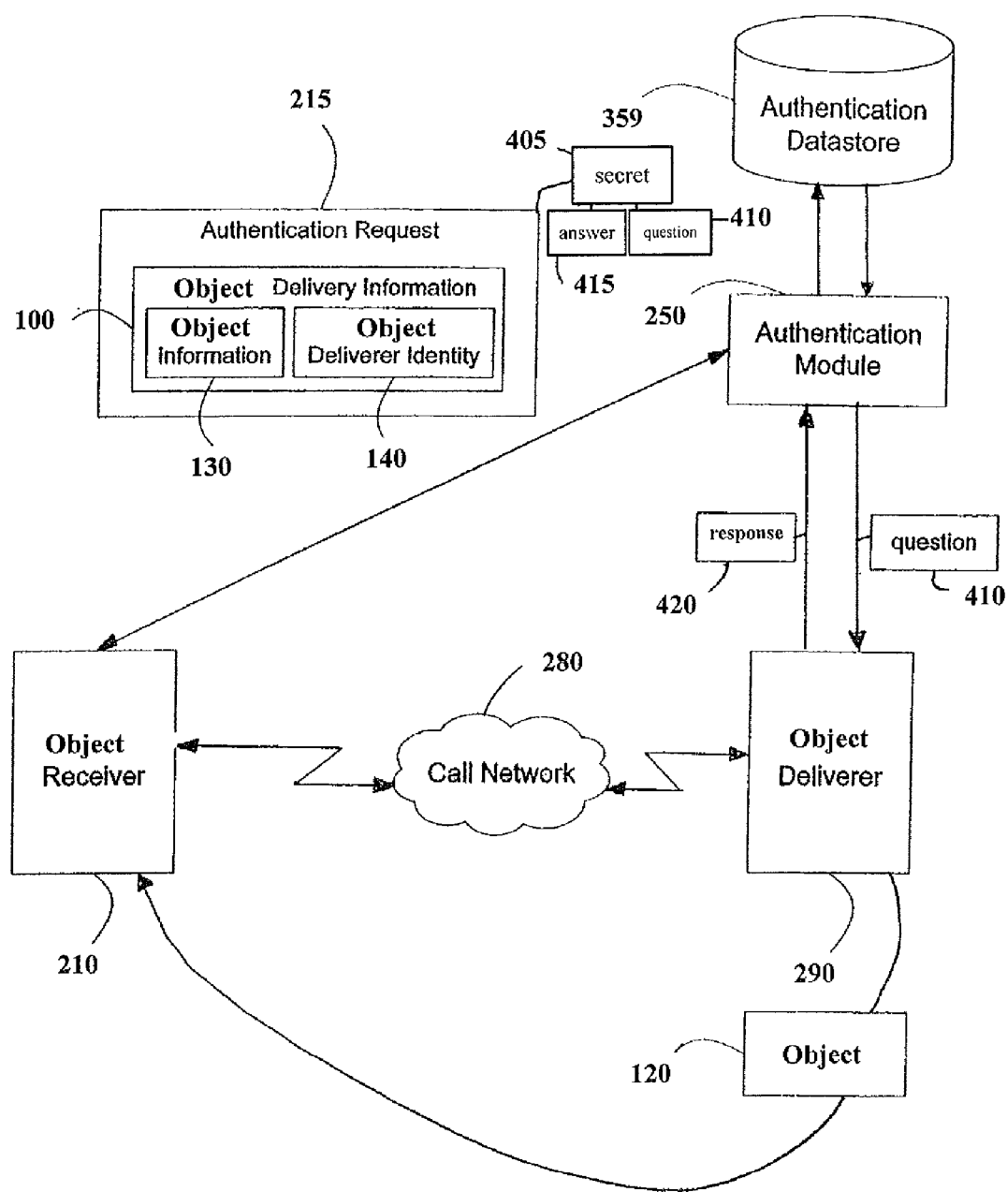
FIG. 4 is a schematic diagram illustrating a process for an authentication module to determine the validity of an object delivery in based on a query in accordance with an exemplary embodiment of the present invention.

Upon receipt of the authentication request 215, in an embodiment, the authentication module 250 authenticates the delivery of the object 120 based on the object delivery information 100 in the authentication request 215. FIGS. 3 and 4, described in detail below, illustrate processes used by the authentication module 250 in embodiments of the present invention to determine if delivery of the object 120 is authentic.

Preferred embodiments of the present invention operate on a call network 280. The call network 280 may include facilities enabling the object deliverer 290, object receiver 210 and authorization module 250 to intercommunicate using a broader public or private network, such as, for example, the Internet, or any other device or method that can communicate alpha numeric data through one or more servers.

Preferred embodiments of the present invention operate in accordance with a plurality of networked computers, such as, for example, an object deliverer computer, object receiver computer and a call network server computer, which are coupled together on a communications network, such as, for example, the Internet or a wide area network. The call network 280 may be a local area network (LAN), a wide area network (WAN), or the Internet, and is hardwired, wireless, or a hybrid thereof.

In one embodiment, after determining that the delivery of the object 120 is authentic, the authentication module 250 returns an authentication result 255 to the object receiver 210 to indicate that the delivery of object 120 is authentic. Alternatively, if the authentication module 250 determines that the delivery of the object 120 is not authentic, the authentication module 250 returns an authentication result 255 to the object receiver 210 to indicate that the delivery of the object 120 is not authentic.

FIG. 3 illustrates a process in an embodiment of the present invention for an authentication module 250 to determine that the delivery of an object 120 is authentic based on information in an authentication datastore 359.

In an embodiment, authentication module 250 connects to an authentication datastore 359. The authentication datastore 359 preferably includes an interface (not depicted) for communication with the authentication module 250. In an embodiment it also includes facilities for storing and retrieving data, such as a hard disk, a computer memory and a processor configured to run computer software, such as a computer database (all not depicted). The various configurations of components and operating software required to implement an authentication datastore as in an embodiment of the present invention are well known to practitioners of ordinary skill in computer systems In an embodiment, the authentication module 250 determines whether the delivery of the object 120 is authentic by determining that the object deliverer identity information 140 is valid. In such an embodiment, the object receiver 210 may send an authentication request 215 to the authentication module 250. The authentication request includes object delivery information 100. For example, the authentication module 250 may accomplish determination by comparing the object deliverer identification information 140 with a plurality of object deliverer identity information entries (not depicted) in the authentication datastore 359. If the object deliverer identity information 140 is a match for any of the entries in the authentication datastore 359, then the authentication module 250 determines that the delivery of object 120 is authentic. Otherwise, no match is found, the authentication module 250 determines that the delivery of the object 120 is not authentic.

In another embodiment, the authentication module 250 determines that the delivery of the object 120 is authentic by determining that object information 130 is valid. In such an embodiment, the authentication datastore 359 includes a plurality of object information entries (not depicted). The authentication module 250 attempts to match the object information 130 with the object information entries in the authentication datastore 359. If there is a match, the authentication module 250 determines that the object information 130, and thus the object 120, is valid. Otherwise, if there is no match, the authentication module 250 determines that the delivery of object 120 in not valid.

In another embodiment, the authentication module 250 determines that the delivery of the object 120 is authentic by determining that the object deliverer identity 140 identifies an authentic object deliverer for an object described by object information 130. The authentication datastore 359 may include a listing of object deliverer identities and associate each object deliverer identity with one or more object information. When the authentication module 250 finds the object deliverer identity 140 associated with the object information 130 in the authentication datastore 359, it determines that the object 120 delivery is authentic. Otherwise, if the object deliver identity 140 is not found in the authentication datastore 359, or if it is not associated therein with the object information 130, then the authentication module 250 finds that the object 120 delivery is not authentic.

In another embodiment, the authentication datastore 359 includes one or more object information—object deliverer identity pairs. The authentication module 250 matches the object information 130 and object deliverer identity 140 provided to it by the object receiver 210 with the authentication datastore's object information—object deliverer identity pairs. If there is a match, the authentication module 250 determines that the object deliverer identity 140 identifies an authentic object deliverer for the object 120 described by the object information 130, and that the delivery of the object 120 is authentic.

In an embodiment of the present invention, the authentication datastore 359 includes a list of one or more object information, each of which object information being associated with one or more object deliverer identities, with each object deliverer identity identifying an authentic object deliverer for an object described by the object information to which it is associated. The authentication module 250 matches object information 130 with the application datastore's one or more object information. If there is a match, the authentication module 250 then matches the object deliverer identity 140 with the one or more object deliverer identities associated with the matched object information. If there is a match, the authentication module 250 determines that the object deliverer identity 140 identifies an authentic object deliverer for the object described by the object information 130, and that the delivery of object 120 is authentic. Otherwise, if no match is found for either the object information 130 or an associated object deliverer identity 140, the authentication module 250 determines that the object deliverer identity 140 does not identify an authentic object deliverer for the object 120.

In an embodiment of the present invention, the authentication datastore 359 includes a list of one or more object deliverer identities, each of which object deliverer identities being associated with one or more object information, with each object deliverer identities identifying an authentic object deliverer for an object described by the object information to which it is associated. The authentication module 250 matches object deliver identity 140 with the application datastore's one or more object deliverer identities. If there is a match, the authentication module 250 then matches the object information 130 with the one or more object information associated with the matched object deliverer identity. If there is a match, the authentication module 250 determines that the object deliverer identity 140 identifies an authentic object deliverer for the object described by the object information 130, and that the delivery of object 120 is authentic. Otherwise, if no match is found for either the object deliverer identity 140 or an associated object information 130, the authentication module 250 determines that the object deliverer identity 140 does not identify an authentic object deliverer for the object 120.

Another exemplary embodiment of the invention, as illustrated in FIG. 4, includes a process whereby the authentication module 250 determines whether the delivery of an object is authentic based on a query posed by the authentication module 250 of the object deliverer 290.

In one embodiment, the query includes a secret 405. The secret 405 may be associated with the object information 130, the object deliverer identity 140, or both.

In another embodiment, the authentication module obtains the secret 405 based on the object delivery information 100. Alternatively, the secret 405 may be obtained from the object delivery information 100 itself, or the secret 405 may be stored in and obtained from the authentication datastore 359. In another embodiment, the authentication module 250 obtains the secret 405 from the authentication datastore 359 using the object delivery information 100. In an embodiment, the authentication module 250 may obtain the secret 405 over a network.

In an embodiment of the present invention, the secret 405 includes a question 410 and an answer 415. The authentication module 250 sends the question 410 to the object deliverer 290, which responds by sending a response 420 to the authentication module 250. Upon receipt of the response 420 from the object deliverer 290, the authentication module 250 compares the response 420 received from the object deliverer with the answer 415 included in the secret 405. If the answer 415 and the response 420 match, the authentication module 250 determines that the delivery of the object 120 is authentic. Otherwise, if the answer 415 and the response 420 do not match, the authentication module 250 determines that the delivery of the object 120 is not authentic.

Examples of questions that may be used with their correct answers in an embodiment of the present invention include, but are not limited to: "what is the password?", "what is the pin code?" and "what is the digital signature?".

In one embodiment, the authentication module 250 sends the question to the object deliverer 290 via the object receiver 210, and receives the answer from the object deliverer 290 via the object receiver 210.

In another embodiment, the authentication module 250 sends the question to and receives the answer from the object deliverer 290 via a connection between the authentication module 250 and the object deliverer 290. The authentication module 250 may establish a connection to the object deliverer 290 based on connection information for the object deliverer 290. This connection information may be included in the object delivery information 100, or it may be included in the authentication datastore 359 and extracted by the authentication module 250 using the object delivery information 100, or it may be obtained from other sources.

In one embodiment, the query from the authentication module 250 to the object deliverer 290 may contain a plurality of questions based on a plurality of secrets, instead of just one. Then, the authentication module 250 ascertains the validity of the delivery of the object based on the number of correct answers provided being equal to or greater than a pre-selected minimum.

Figure 5:
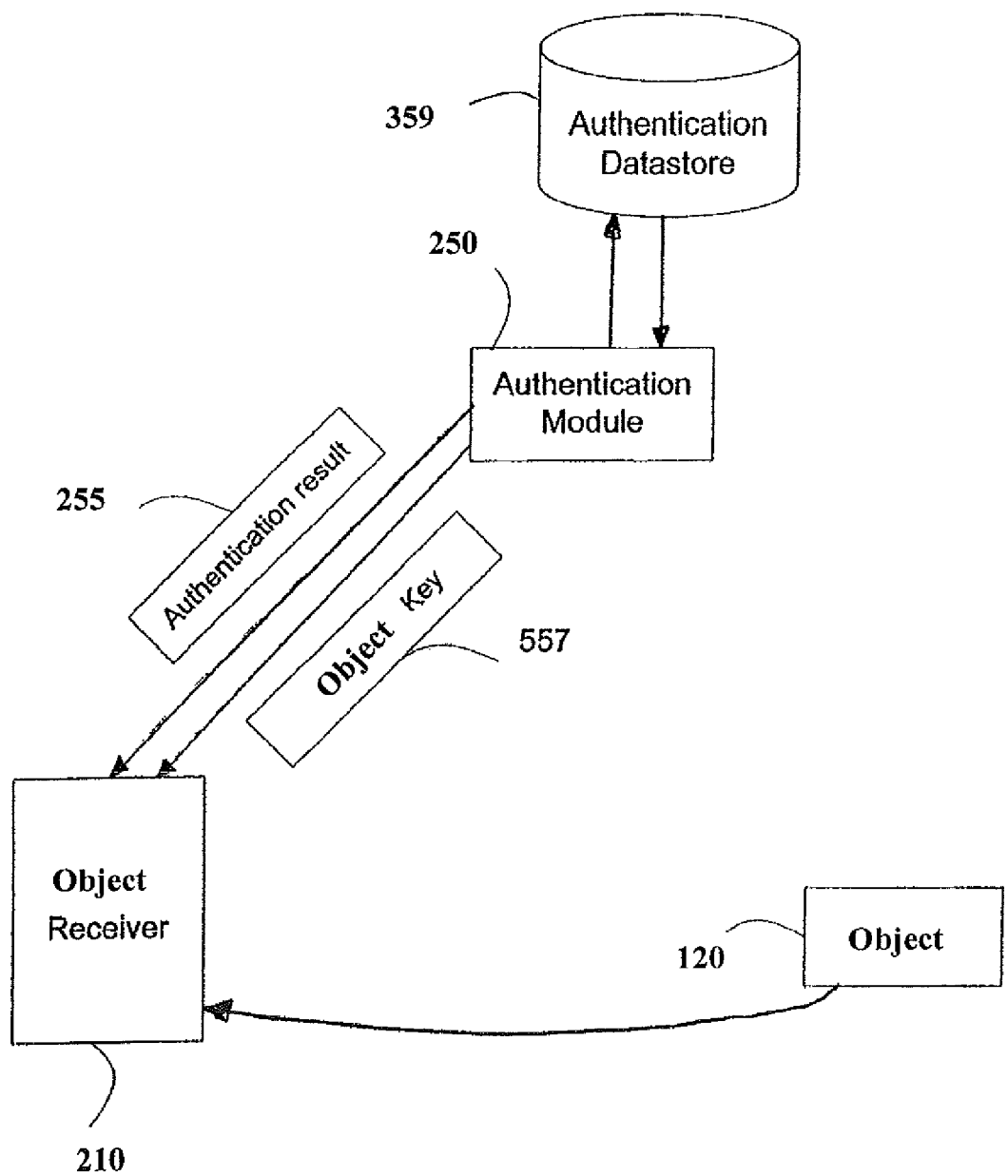
FIG. 5 is a schematic diagram illustrating an exemplary process where an authentication module provides a key to an object receiver, in accordance with an embodiment of the present invention.

FIG. 5 illustrates an embodiment of the present invention in which the authentication module 250 provides an object key 557 to the object receiver 210.

As mentioned, the authentication module 250 provides an object key 557 associated with object 120 to the object receiver 210 after determining that the delivery of the object 120 is authentic. In one embodiment, the authentication module 250 provides the object key 557 to the object receiver 210 in the authentication result 255. In another embodiment, the authentication module 250 provides the object key 557 to the object receiver 210 after returning the authentication result 255 to the object receiver 210.

In an embodiment, the object 120 is encrypted and the object key 557 includes a decryption key for the object 120. The object receiver 210 may then use the object key 557 to decrypt the object 120.

Figure 6:
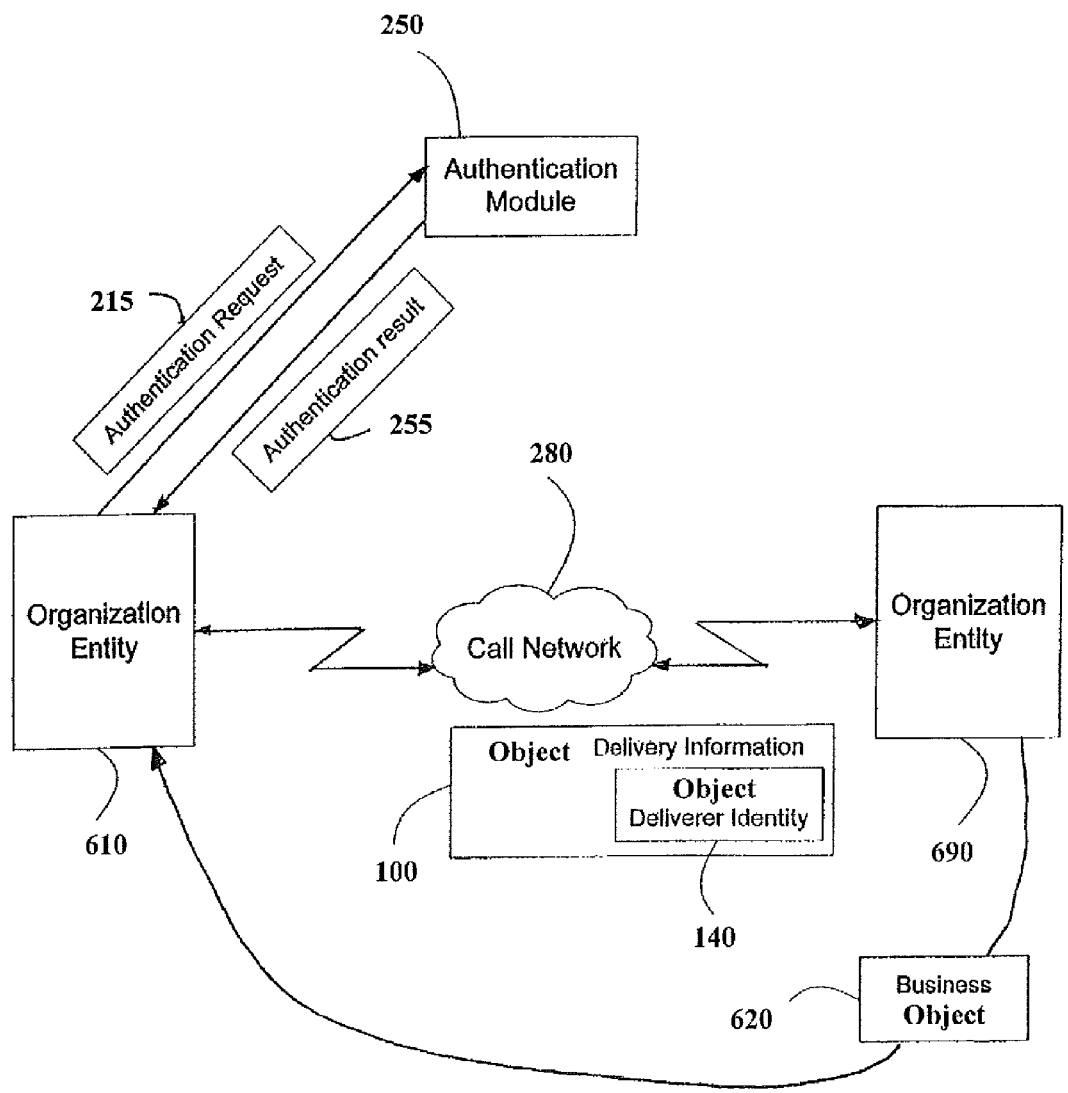
FIG. 6 is a schematic diagram illustrating a process for a second organization entity to authenticate delivery of a business object by a first organization entity in accordance with an exemplary embodiment of the present invention.

FIG. 6 illustrates an exemplary process in accordance with the present invention for one organization entity 610 to authenticate the delivery of a business object 620 by another organization entity 690. One organization entity 690 corresponds to a first organization. The other organization entity 610 corresponds to a second organization. The first and second organizations have a need to exchange business objects. Organization entities 610, 690 may be any organizations, companies, corporations, or may have other business forms, and need not be of the same form. The business object 620 may be a contract, proposal, technical specification, invoice or other business-related object.

In an embodiment, one organization entity 690 and another organization entity 610 are conducting a voice call over a call network 280. One organization entity 690 sends an object delivery information 100 including an object deliverer identity 140 that identifies the organization entity 690 to the other organization entity 610. The organization entity 610 receiving the object delivery information 100 sends an authentication request 215 to the authentication module 250. The authentication module 250 then determines whether the object deliverer identity 140 is valid, as described herein, and sends a authentication result 255 back to the organization entity 610.

Figure 7:
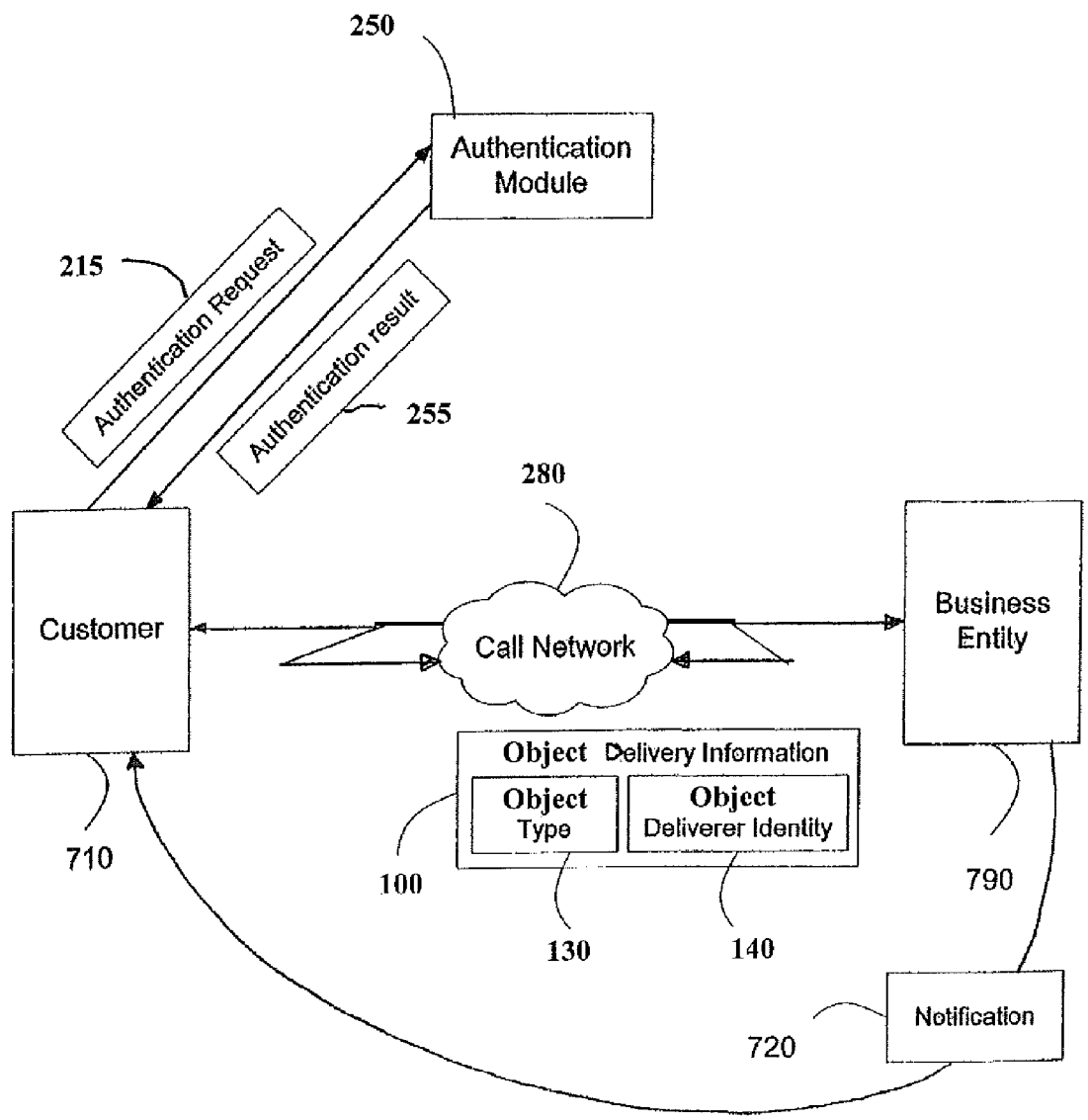
FIG. 7 is a schematic diagram illustrating a process for a customer to authenticate delivery of a notification by a business entity in accordance with an exemplary embodiment of the present invention.

FIG. 7 illustrates a process for a customer 710 to authenticate the delivery of a notification 720 by a business entity 790 in an exemplary embodiment of the present invention. With reference to FIG. 2, business entity 790 functionally represents the object deliverer 290, customer 710 functionally represents the object receiver 210, and the notification 720 is the object 120.

In an exemplary embodiment, business entity 790 corresponds to a business. The business entity 790 may be an online retail business, in which case the notification 720 may be but is not limited to an order confirmation notification, an order fulfillment notification or a shipment tracking notification; or the business entity 790 may be a bank, in which case the notification 720 may be but is not limited to a monthly statement, a mortgage late payment notification, or a security risk notification for a credit card account. In yet another exemplary embodiment, the business entity 790 may be a magazine publisher, and the notification 720 be but is not limited to a subscription expiration notification or a subscription promotion notification. In an other exemplary embodiment, the business entity 790 may be a telemarketer, and the notification 720 may be an advertisement notification, a promotional offer notification, or a charity pledge notification. Numerous other embodiments are also possible for many other types of business.

In an embodiment the business entity 790 makes a voice call to the customer 710 over the call network 780. The business entity 790 sends the object delivery information 100 to the customer 710. The object delivery information 100 preferably includes object type 130 and object deliverer identity 140. The object type 130 indicates a notification-type object. The object deliverer identity 140 identifies the business entity 790. The authentication module 250 determines whether the delivery of notification 720 is authentic by determining that the object deliverer identity 140 identifies an authentic object deliverer for the object classified by object type 130, using the methodology described herein.

Figure 8:
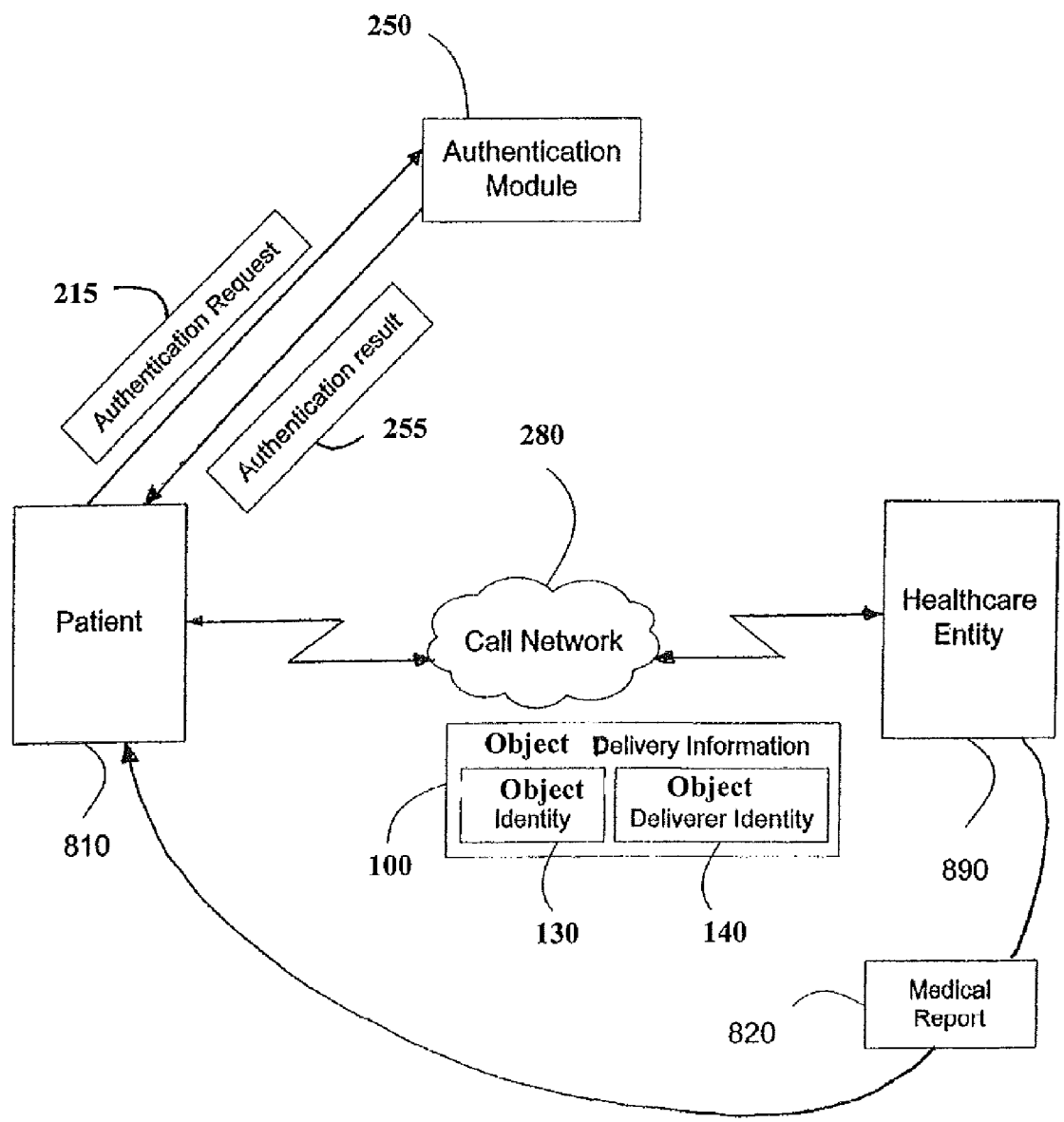
FIG. 8 is a schematic diagram illustrating a process for a patient to authenticate delivery of a medical report by a healthcare entity in accordance with an exemplary embodiment of the present invention.

FIG. 8 illustrates a process for a patient 810 to authenticate the delivery of a medical report 820 by a healthcare entity 890. With reference to FIG. 2, the healthcare entity 890 functionally represents the object deliverer 290, the patient 810 functionally represents the object receiver 210, and the medical report 820 represents the object 120 to be delivered.

In an embodiment, healthcare entity 890 makes a call to the patient 810 over a call network 280. Object delivery information 100 includes object identity 130 and object deliverer identity 140. The object identity 130 identifies the medical report 820, and the object deliverer identity 140 identifies the healthcare entity 890. The authentication module 250 determines whether the delivery of the medical report 820 is authentic by determining that the object deliverer identity 140 identifies an authentic object deliverer for the object identified by object identity 130 as described above, e.g., for FIG. 2.

In one embodiment, the object deliverer 290 delivers an object 120 to an object receiver 210 via the call network 280. In another embodiment, the call network 280 includes a data network for the delivery of the object 120.

In an embodiment, the authentication module 250 communicates the object deliverer through a data communication session. In one embodiment, this data communication session is over the call network 280.

In one embodiment, the object delivery information 100 is sent through a data network. The call between the object receiver 210 and the object deliverer 290 includes a data communication session. In such an embodiment, the call network 280 includes a data network.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An object delivery authentication system, comprising:
an authentication module and an authentication datastore in communication with the authentication module, the authentication module comprising a hardware processor configured to be linked in communication with an object receiver, the authentication module operable to (i) receive from the object receiver over at least one of a call network and an additional network an authentication request for one or more of an object and an object delivery information package received from an object deliverer and (ii) authenticate the object and/or the received object delivery information package using object information and/or object deliverer identity information,
wherein the authentication module is further operable to compare one or more entries in the authentication datastore with the object information only,
associate a secret with the object delivery information package, wherein the secret comprises at least one secret question and a corresponding at least one secret answer;
send the at least one secret question to the object deliverer;
receive at least one answer to the at least one secret question from the object deliverer; and
determine whether the object and/or the object delivery information package is or is not authentic, based on whether the at least one answer from the object deliverer matches the at least one secret answer, and whether a number of correct secret answers provided are equal to or greater than a pre-selected minimum number; and wherein
the authentication module is operable to provide an object key associated with the object and/or the object delivery information package to the object receiver after determining that the object deliverer is authenticated to deliver the object.

2. The object delivery authentication system according to claim 1 wherein the object delivery information package further comprises object information enabling the receiver to receive an object from the deliverer using the key and the object information.

3. The object delivery authentication system according to claim 1 wherein the authentication module is operable to send to the receiver a result that the object and/or the object delivery information package is or is not authentic.

4. The object delivery authentication system according to claim 1 wherein the object delivery information package comprises an object.

5. The object delivery authentication system according to claim 1, wherein the authentication datastore comprises the one or more entries.

6. The object delivery authentication system according to claim 1, wherein the authentication datastore comprises at least one object deliverer identity, each of the at least one object deliverer identity associated with at least one object delivery information.

7. An object delivery authentication system comprising:
an authentication module and an authentication datastore in communication with the authentication module, the authentication module comprising a hardware processor configured to be linked in communication with an object receiver, the authentication module operable to (i) receive from the object receiver over at least one of a call network and an additional network an authentication request for one or more of an object and an object delivery information package received from an object deliverer and (ii) authenticate the object and/or the received object delivery information package using object information and/or object deliverer identity information,
wherein the authentication datastore comprises at least one object deliverer identity, each of the at least one object deliverer identity associated with at least one object delivery information,
wherein the authentication module is further operable to compare one or more entries in the authentication datastore with at least one of (i) the object deliverer identity information and (ii) the object information,
associate a secret with the object delivery information package, wherein the secret comprises at least one secret question and a corresponding at least one secret answer;
send the at least one secret question to the object deliverer;
receive at least one answer to the at least one secret question from the object deliverer; and
determine whether the object and/or the object delivery information package is or is not authentic, based on whether the at least one answer from the object deliverer matches the at least one secret answer, and whether a number of correct secret answers provided are equal to or greater than a pre-selected minimum number; and wherein
the authentication module is operable to provide an object key associated with the object and/or the object delivery information package to the object receiver after determining that the object deliverer is authenticated to deliver the object, and wherein the authentication module is operable to compare the object delivery information package with the at least one object deliverer identity and the associated object delivery information in the authentication datastore, wherein when the object delivery information package matches an object delivery information associated with the object deliverer identity in the authentication datastore, the authentication module is operable to send to the object receiver a result that the object and/or the object delivery information package is authentic.

8. An object delivery authentication system comprising:
an authentication module and an authentication datastore in communication with the authentication module, the authentication module comprising a hardware processor configured to be linked in communication with an object receiver, the authentication module operable to (i) receive from the object receiver over at least one of a call network and an additional network an authentication request for one or more of an object and an object delivery information package received from an object deliverer and (ii) authenticate the object and/or the received object delivery information package using object information and/or object deliverer identity information,
wherein the authentication datastore comprises at least one object deliverer identity, each of the at least one object deliverer identity associated with at least one object delivery information,
wherein the authentication module is further operable to compare one or more entries in the authentication datastore with at least one of (i) the object deliverer identity information and (ii) the object information,
associate a secret with the object delivery information package, wherein the secret comprises at least one secret question and a corresponding at least one secret answer;
send the at least one secret question to the object deliverer;
receive at least one answer to the at least one secret question from the object deliverer; and
determine whether the object and/or the object delivery information package is or is not authentic, based on whether the at least one answer from the object deliverer matches the at least one secret answer, and whether a number of correct secret answers provided are equal to or greater than a pre-selected minimum number; and wherein
the authentication module is operable to provide an object key associated with the object and/or the object delivery information package to the object receiver after determining that the object deliverer is authenticated to deliver the object, and wherein the authentication module is operable to compare the object delivery information package with the at least one object deliverer identity and the associated object delivery information in the authentication datastore, wherein when the object delivery information package does not match an object delivery information associated with the object deliverer identity in the authentication datastore, the authentication module is operable to send to the object receiver a result that the object and/or the object delivery information package is not authentic.

* * * * *